United States Patent
Ose

(10) Patent No.: US 6,199,446 B1
(45) Date of Patent: Mar. 13, 2001

(54) INDICATOR UNIT FOR A BICYCLE SHIFT CONTROL DEVICE

(75) Inventor: Kenji Ose, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/238,529

(22) Filed: Jan. 27, 1999

(51) Int. Cl.[7] .................................................. F16C 1/16
(52) U.S. Cl. ........................ 74/502.2; 74/107; 74/109; 74/473.14; 74/489; 74/DIG. 7; 116/28.1; 116/284
(58) Field of Search ............................... 74/DIG. 7, 107, 74/109, 473.13, 473.14, 489, 502.2; 116/28.1, 284, 285, 294, 297, 300, 303, DIG. 2

(56) References Cited

U.S. PATENT DOCUMENTS

| | | | |
|---|---|---|---|
| 1,683,710 | * 9/1928 | Zitzmann | 116/303 |
| 1,918,672 | * 7/1933 | Szabo | 116/285 |
| 2,213,297 | * 9/1940 | Zitzmann | 116/285 |
| 2,272,988 | * 2/1942 | Williams | 116/285 |
| 2,391,231 | * 12/1945 | Edwards | 74/107 |
| 3,087,380 | * 4/1963 | Greger et al. | 116/294 |
| 3,220,267 | * 11/1965 | Smith | 74/107 |
| 3,236,107 | * 2/1966 | Magnusson | 74/107 |
| 3,443,705 | * 5/1969 | Buttram | 116/300 |
| 3,524,979 | 8/1970 | Cohen | 240/2 |
| 3,633,437 | 1/1972 | Ishida | 74/489 |
| 3,673,979 | * 7/1972 | Kunov | 116/285 |

(List continued on next page.)

FOREIGN PATENT DOCUMENTS

| | | |
|---|---|---|
| 91 13 406 U | 2/1992 | (DE) . |
| 647556 A2 | 4/1995 | (EP) . |
| 60-23273 | 7/1985 | (JP) . |
| 61-5348 | 2/1986 | (JP) . |

OTHER PUBLICATIONS

U.S. application No. 08/898,457, filed Jul. 23, 1997.
U.S. application No. 08/995,276, filed Dec. 19, 1997.
U.S. application No. 09/023,240, filed Feb. 13, 1998.
U.S. application No. 09/196,210, filed Nov. 20, 1998.

Primary Examiner—David A. Bucci
Assistant Examiner—Chong H. Kim
(74) Attorney, Agent, or Firm—James A. Deland

(57) ABSTRACT

An indicator is provided for engaging a first control cable connected to a first bicycle shift control device and for engaging a second control cable connected to a second bicycle shift control device. The indicator includes a housing; a handlebar attachment member for attaching the housing to a handlebar; a first intermediate member; a first coupling member coupled to the first intermediate member for coupling the first intermediate member for movement with the first control cable; and a separate first indicating member viewable from outside the housing, wherein the first indicating member engages the first intermediate member so that movement of the first intermediate member causes movement of the first indicating member. The indicator also includes a second intermediate member; a second coupling member coupled to the second intermediate member for coupling the second intermediate member for movement with the second control cable; and a separate second indicating member viewable from outside the housing, wherein the second indicating member engages the second intermediate member so that movement of the second intermediate member along the guide surface causes movement of the second indicating member. A first biasing mechanism is provided for biasing the first intermediate member in a first direction, and a second biasing mechanism is provided for biasing the second intermediate member in a second direction. The first direction may be different from the second direction to accommodate control cables that do not move in the same direction.

21 Claims, 5 Drawing Sheets

U.S. PATENT DOCUMENTS

| | | | | |
|---|---|---|---|---|
| 3,721,010 | * | 3/1973 | Ristow | 116/285 |
| 3,866,477 | * | 2/1975 | Schmid et al. | 74/10.45 |
| 3,985,095 | * | 10/1976 | Nurse | 116/28.1 |
| 4,208,981 | * | 6/1980 | Coha et al. | 116/28.1 |
| 4,782,782 | * | 11/1988 | Nill | 116/28.1 |
| 4,859,984 | | 8/1989 | Romano | 340/432 |
| 5,038,824 | * | 8/1991 | Hyde et al. | 74/107 |
| 5,178,033 | | 1/1993 | Kund | 74/501.5 R |
| 5,197,927 | | 3/1993 | Patterson et al. | 474/80 |
| 5,251,503 | * | 10/1993 | Morris et al. | 74/335 |
| 5,289,794 | * | 3/1994 | Jerro et al. | 116/28.1 |
| 5,458,018 | | 10/1995 | Kawakami | 74/502.2 |
| 5,551,315 | * | 9/1996 | Pikoulas | 74/502.2 |
| 5,621,382 | | 4/1997 | Yamamoto | 340/432 |
| 5,983,728 | * | 11/1999 | Weng | 116/285 |

* cited by examiner

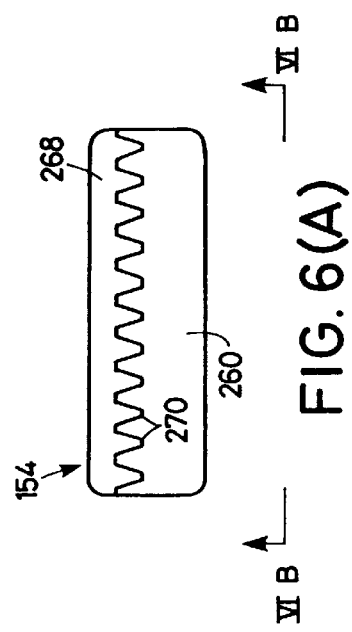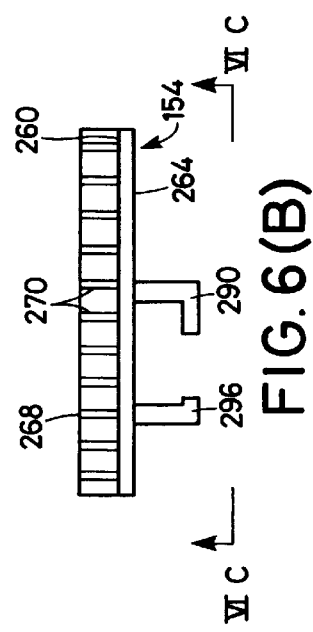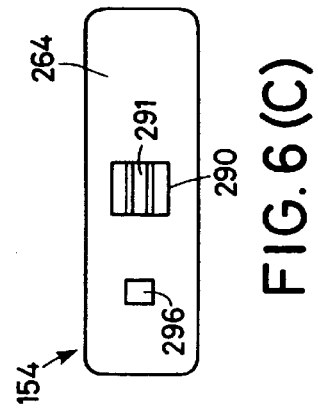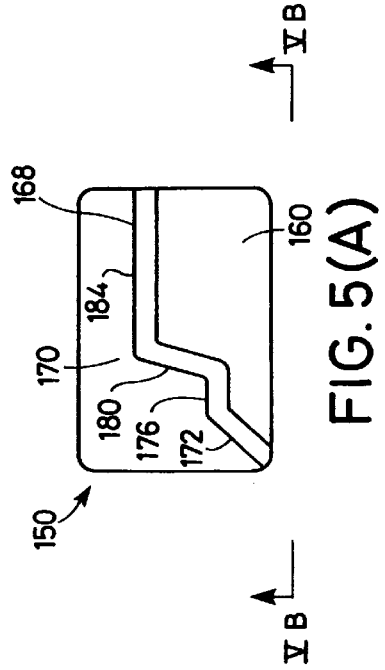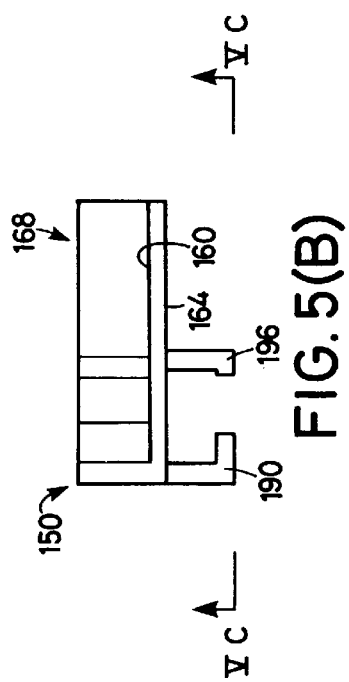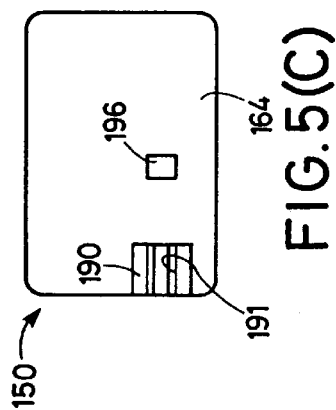

INDICATOR UNIT FOR A BICYCLE SHIFT CONTROL DEVICE

BACKGROUND OF THE INVENTION

The present invention is directed to control devices for bicycle transmissions and, more particularly, to an indicator unit for a bicycle shift control device.

Many bicycle shift control devices have indicators associated with them to indicate the currently selected gear of the bicycle transmission. Derailleur operated transmissions usually have a front derailleur shift control device and a rear derailleur shift control device, so one indicator is usually mounted on the front derailleur shift control device to indicate the currently selected gear for the front derailleur, and another indicator is usually mounted to the rear derailleur shift control device to indicate the currently selected gear for the rear derailleur. Since the shift control devices are usually mounted on opposite sides of the bicycle handlebar, the user must inconveniently look to opposite ends of the handlebar to ascertain the state of both bicycle transmissions.

One attempt to overcome the inconvenience noted above is shown in JP 61-5348. That publication shows a combined front and rear shift control device that is integrally formed with the handlebar stem extension. The combined shift control device includes indicators for indicating the state of each bicycle transmission, but the unit is highly specialized and can not be used with existing shift control devices. Another attempt to overcome the inconveniences noted above is disclosed in U.S. Pat. No. 5,178,033. That publication shows a separate indicator unit for centrally indicating the state of both the front and rear bicycle transmissions, wherein the indicator unit may be used with existing shift control devices. However, the indicator unit uses a pair of rotating wheels with numbers printed on them to indicate the currently selected gears. This requires the rider to directly look at the indicator unit and read each number to determine the currently selected gear, which can be inconvenient in a racing environment.

SUMMARY OF THE INVENTION

The present invention is directed to an indicator unit for a bicycle shift control device wherein the currently selected speed stage for both front and rear bicycle transmissions may be ascertained from a centralized location and without having to directly read numbers. In one embodiment of the present invention, an indicator unit is provided for engaging a first control cable connected to a first bicycle shift control device and for engaging a second control cable connected to a second bicycle shift control device. The indicator unit includes a housing; a handlebar attachment member for attaching the housing to a handlebar, a first intermediate member; a first coupling member coupled to the first intermediate member for coupling the first intermediate member for movement with the first control cable; and a separate first indicating member viewable from outside the housing, wherein the first indicating member engages the first intermediate member so that movement of the first intermediate member causes movement of the first indicating member. The indicator unit also includes a second intermediate member; a second coupling member coupled to the second intermediate member for coupling the second intermediate member for movement with the second control cable; and a separate second indicating member viewable from outside the housing, wherein the second indicating member engages the second intermediate member so that movement of the second intermediate member along the guide surface causes movement of the second indicating member. A first biasing mechanism is provided for biasing the first intermediate member in a first direction, and a second biasing mechanism is provided for biasing the second intermediate member in a second direction. The first direction may be different from the second direction to accommodate control cables that do not move in the same direction.

In a more specific embodiment, movement of the first and second intermediate members cause movement of the first and second indicating member to different viewable positions along the housing. This allows the state of each bicycle transmission to be sensed without having to read numbers or other indicia In the case of indicating members that rotate in response to movement of the intermediate members, this may be facilitated by exposing the indicating members for viewing in a direction of the rotational axis of the indicating members, especially if the indicating members are formed as elongated members.

BRIEF DESCRIPTION OF THE DRAWINGS

FIG. 5(A) is a top view of a camming intermediate member shown in FIG. 3;

FIG. 5(B) is a view taken along line VB—VB in FIG. 5(A);

FIG. 5(C) is a view taken along line VC—VC in FIG. 5(B);

FIG. 6(A) is a top view of a gearing intermediate member shown in FIG. 3;

FIG. 6(B) is a view taken along line VIB—VIB in FIG. 6(A);

FIG. 6(C) is a view taken along line VIC—VIC in FIG. 6(B);

DETAILED DESCRIPTION OF THE EMBODIMENTS

Figure 1:
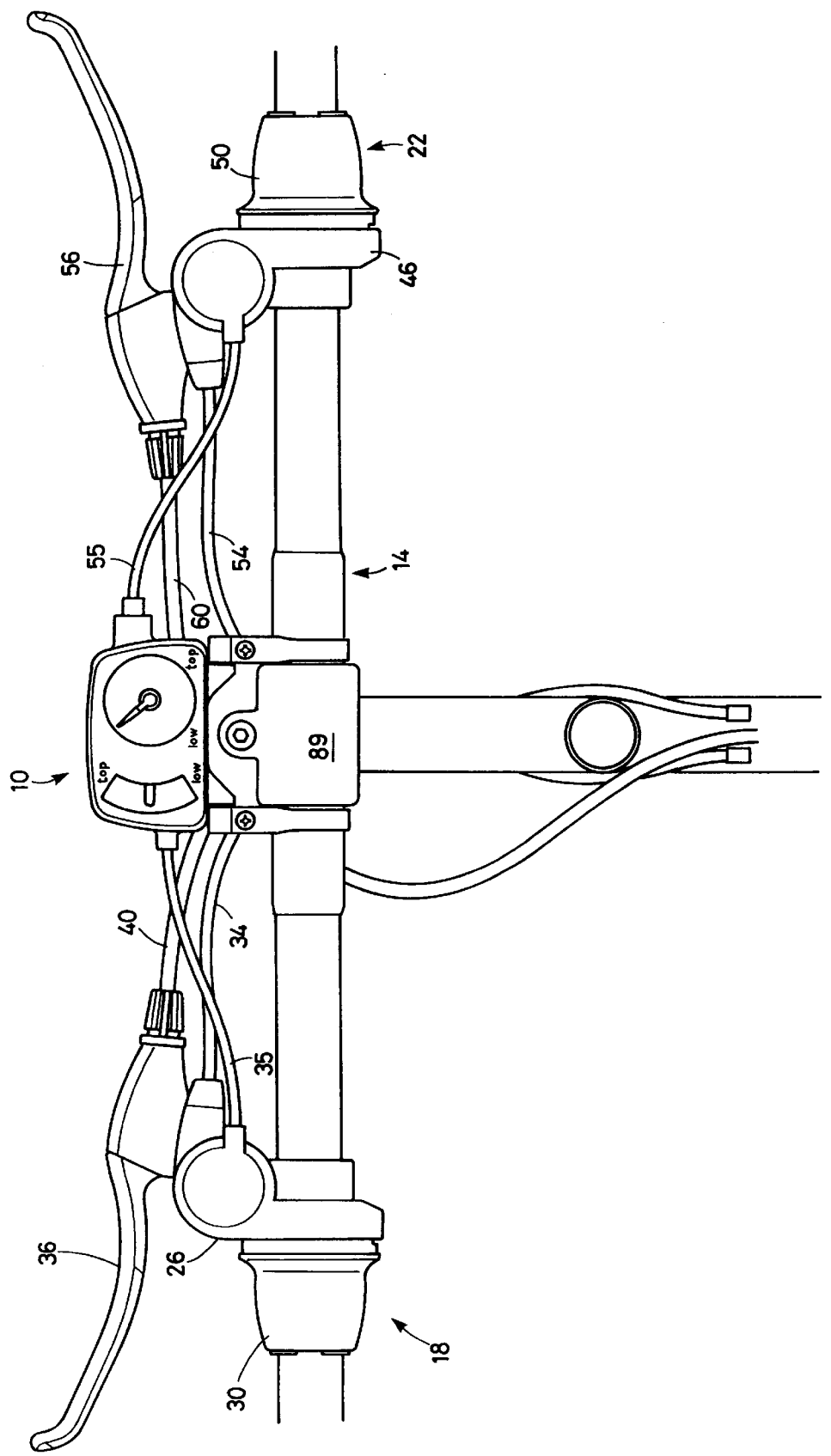
FIG. 1 is a top view of a particular embodiment of an indicator unit according to the present invention, wherein the indicator unit is attached to a bicycle handlebar and to front and rear shift control devices.

FIG. 1 is a top view of a particular embodiment of an indicator unit 10 according to the present invention, wherein indicator unit 10 is attached to a bicycle handlebar 14, to a front shift control device 18 and to a rear shift control device 22. Front shift control device 18 and rear shift control device 22 may be constructed according to the teachings of allowed U.S. patent application Ser. No. 08/854,520, U.S. Pat. No. 3,633,437, both incorporated herein by reference, or any other type of shift control device that can be modified to accommodate cables used to control indicator unit 10 as described below.

In this embodiment, front shift control device 18 includes a shift control housing 26 and an annular rotatable member 30 rotatably mounted to shift control housing 26. Rotatable member 30 operates a pulley (not shown) through an indexing mechanism (not shown) contained within shift control housing 26 to control the operation of a Bowden-type derailleur cable 34 in a well known manner. The pulley used to control derailleur cable 34 may have an additional winding surface to accommodate a Bowden-type front indicator cable 35. A brake lever 36 is rotatably mounted to shift control housing 26 for controlling a front brake apparatus (not shown) through a Bowden-type brake cable 40. Similarly, rear shift control device 22 includes a shift control housing 46 and an annular rotatable member 50 rotatably mounted to shift control housing 46. Rotatable member 50 operates a pulley (not shown) through an indexing mechanism (not shown) contained within shift control housing 46 to control the operation of a Bowden-type derailleur cable 54 in a well known manner. The pulley used to control derailleur cable 54 may have an additional winding surface to accommodate a Bowden-type rear indicator cable 55. A brake lever 56 is rotatably mounted to shift control housing 46 for controlling a front brake apparatus (not shown) through a Bowden-type brake cable 60.

Figure 2:
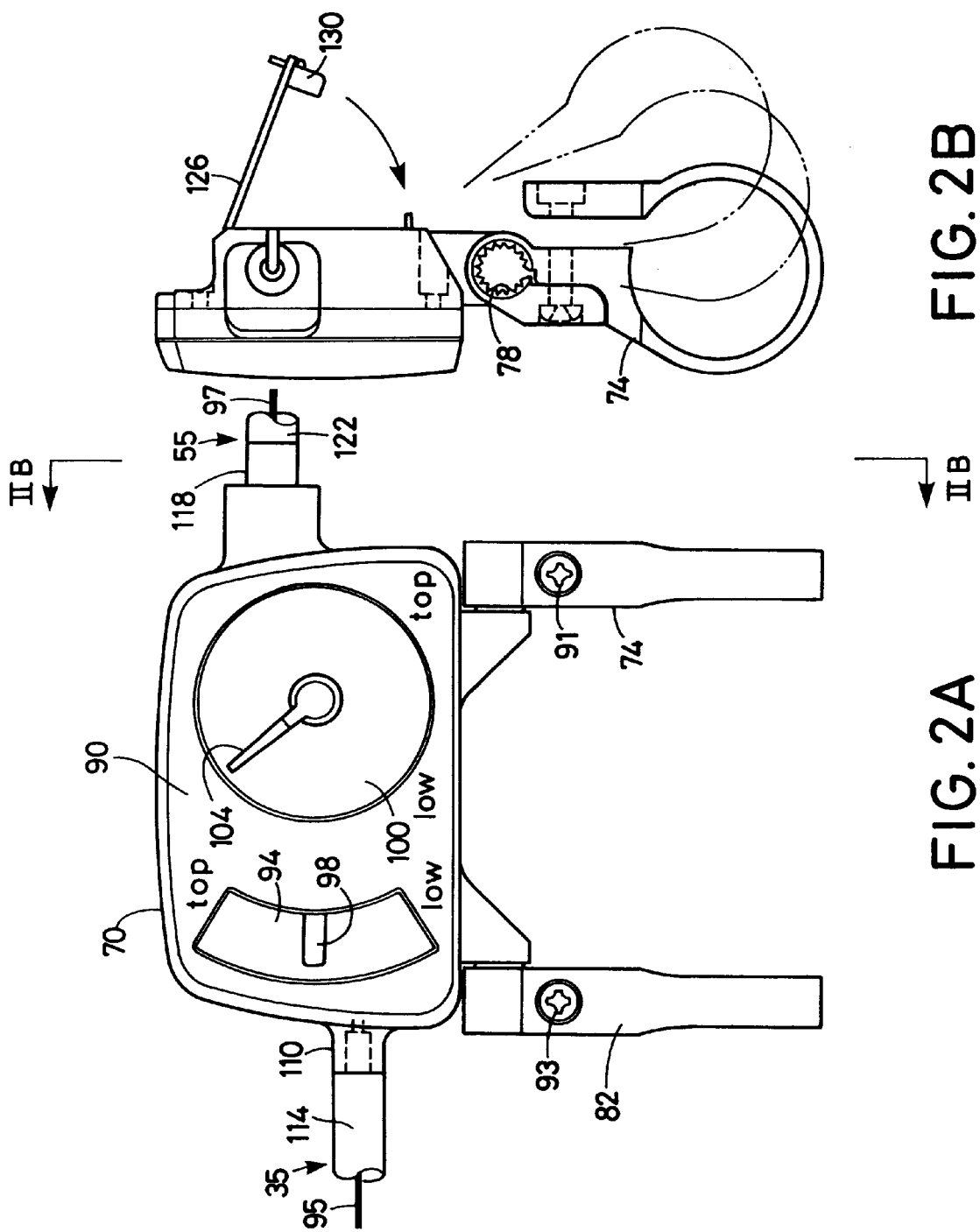
FIG. 2(A) is a top view of the indicator unit shown in FIG. 1.
FIG. 2(B) is a view taken along line IIB—IIB in FIG. 2(A)

As shown in FIGS. 1, 2(A) and 2(B), indicator unit 10 includes an indicator housing 70, a first handlebar attachment member 74 movably coupled to housing 70 through a first splined connection 78, and a second handlebar attachment member 82 movably coupled to indicator housing 70 through a second splined connection 86. First handlebar attachment member 74 normally is oriented generally parallel to second handlebar attachment member 82, and they are spaced apart from each other so that they may be attached to handlebar 14 on opposite sides of a centrally disposed handlebar stem 89. However, because of the first and second splined connections 78 and 86, the position of first and second handlebar attachment members 74 and 82 relative to indicator housing 70 may be adjusted as shown by the broken line in FIG. 2(B). This allows the viewing angle of indicator unit 10 to be varied as desired. First and second handlebar attachment members 74 and 82 are formed as U-shaped members as shown in FIG. 2(B) (only first handlebar attachment member 74 is shown). First and second handlebar attachment members 74 and 82 are secured to handlebar 14 through nut and bolt assemblies 91 and 93, respectively, in a well known manner.

A top cover surface 90 of indicator housing 70 includes a transparent window 94 for viewing a front gear indicating member 98 therethrough and a transparent cover 100 for viewing a rear gear indicating member 104 therethrough. A front cable stop 110 is disposed on the left side of indicator housing 70 for terminating an outer casing 114 of front indicator cable 35, and a rear cable stop 118 is disposed on the right side of indicator housing 70 for terminating an outer casing 122 of rear indicator cable 55. A rear cover 126 (FIG. 2(B)) is pivotably coupled to the rear of indicator housing 70 so that the rear of indicator housing 70 may be accessed for attachment of the inner wires 95 and 97 of front and rear indicator cables 35 and 55, respectively to the components inside indicator housing 70. A latch 130 is disposed on the lower portion of rear cover 126 for securing the lower portion of rear cover 126 to indicator housing 70.

Figure 3:
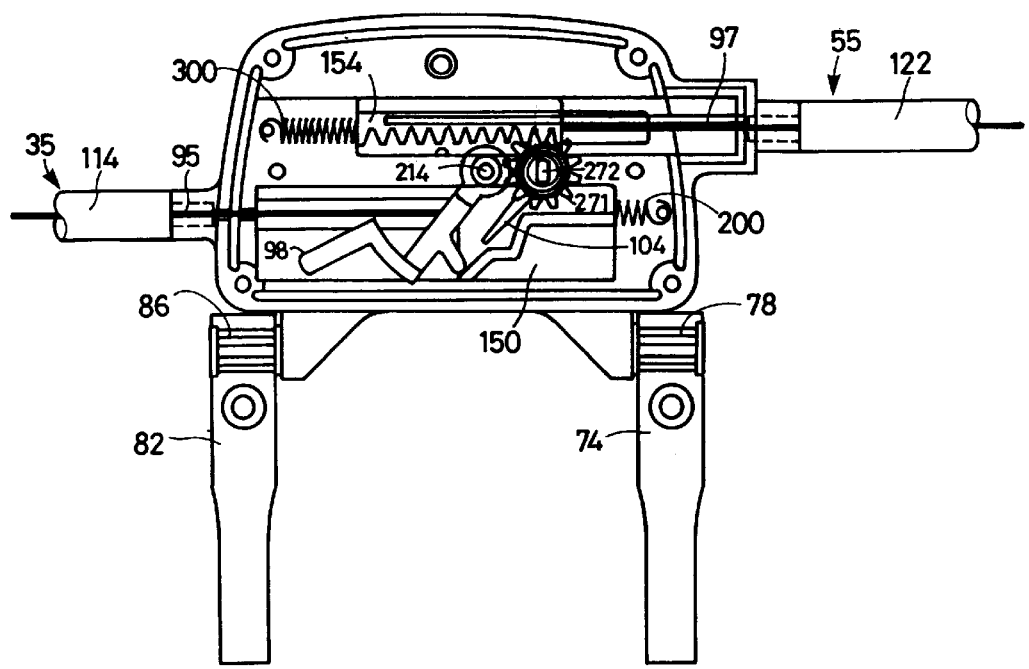
FIG. 3 is a top view of the interior of the indicator unit.
Figure 4:
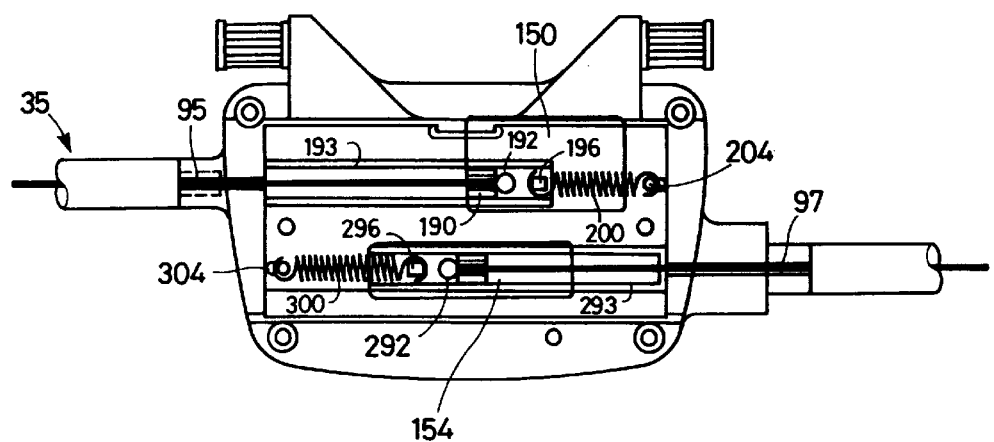
FIG. 4 is a bottom view of the interior of the indicator unit.

FIG. 3 is a top view of the interior of indicator unit 10, and FIG. 4 is a bottom view of the interior of indicator unit 10 (without first and second handlebar attachment members 74 and 82). As shown in those Figures, inner wire 95 of front indicator cable 35 is coupled to an intermediate member in the form of a camming member 150, and inner wire 97 of rear indicator cable 55 is coupled to an intermediate member in the form of a gearing member 154.

As shown in FIGS. 5(A–C), camming member 150 is a generally rectangular shaped member with a generally flat top surface 160 and a generally flat bottom surface 164. A camming wall 168 is disposed on top surface 160. Camming wall 168 forms a camming surface 170 including a first inclined surface 172, a first horizontal surface 176, a second inclined surface 180, and a second horizontal surface 184. As discussed below with reference to FIGS. 7 and 8, camming surface 170 cooperates with front indicating member 98 to move front indicating member 98 to various locations relative to indicator housing 70.

Camming member 150 includes a cable terminating projection 190 with a cable slot 191 extending from bottom surface 164 for retaining a cable end bead 192 formed on the end of inner wire 95 as shown in FIG. 4 by placing inner wire 95 in slot 191. Thus, cable terminating projection 190 functions as a coupling member for coupling inner wire 95 to camming member 150. Cable terminating projection 190 slides within a straight recessed guide surface or track 193 formed in indicator housing 70 so that camming member 150 moves in a straight line in response to movement of inner wire 95. Camming member 150 also includes a spring retaining post 196 extending from bottom surface 164 for retaining one end of a coil spring 200. The other end of coil spring 200 is attached to a spring retaining post 204 extending from the surface of indicator housing 70. Thus, coil spring 200 functions as a biasing mechanism for biasing camming member 150 to the right in FIGS. 3 and 4.

Figure 7:
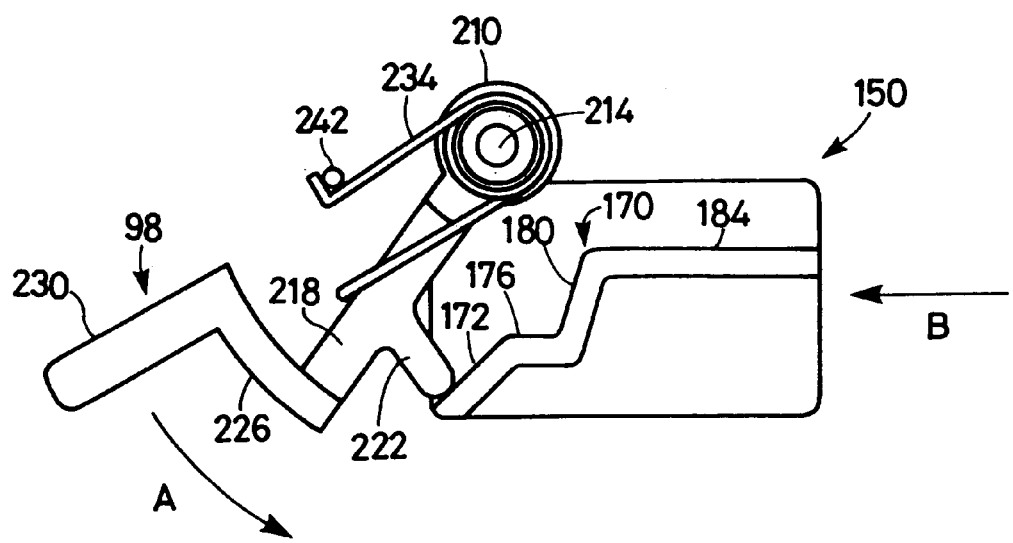
FIG. 7 is a detailed view of the camming intermediate member and camming indicating member shown in FIG. 3.
Figure 8:
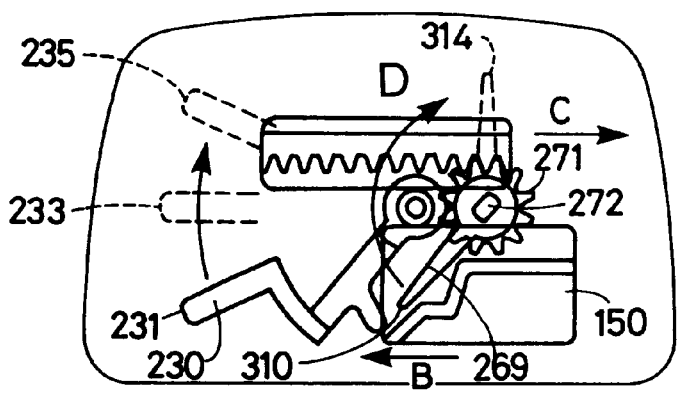
FIG. 8 is a schematic view showing the operation of the indicator unit shown in FIG. 3.

As shown in FIGS. 3 and 7, the separate front indicating member 98 includes a support portion 210 rotatably mounted around a pivot shaft 214 extending from indicator housing 70, a generally straight main body portion 218 extending from support portion 210, a cam follower portion 222 projecting at an incline from main body portion 218, a viewing needle support portion 226 arcuately extending approximately perpendicular from the end of main body portion 218, and a generally straight front viewing needle 230 extending from viewing needle support portion 226. A spring 234 has one end abutting a spring retaining post 242 extending from indicator case 70 and another end abutting against main body portion 218. Thus, spring 234 functions as a biasing mechanism for biasing cam follower portion 222 in the direction of arrow A towards camming surface 170 on camming member 150. Front viewing needle 230 is in a low speed viewable position 231 relative to indicator housing 70 in this position as shown in FIG. 8.

In operation, rotating rotatable member 30 of front shift control device 18 causes the pulley inside housing 26 to pull inner wire 95. This causes camming member 150 to move to the left as shown by arrow B in FIGS. 7 and 8. As camming member 150 moves to the left, cam follower portion 222 slides along first inclined surface 172 and front gear indicating member 98 rotates around the axis defined by pivot shaft 214 until cam follower portion 222 rests on first horizontal surface 176. Front viewing needle 230 is in an intermediate speed viewable position 233 relative to indicator housing 70 in this position. Further rotating of rotatable member 30 and pulling of inner wire 95 causes cam follower portion 222 to slide along second inclined surface 180 until cam follower portion 222 rests on second horizontal surface 184. Front viewing needle 230 is in a top or high speed viewable position 235 relative to indicator housing 70 in this position. Rotating rotatable member 30 in the opposite direction likewise causes camming member 150 and front gear indicating member 98 to move in the opposite direction with the aid of biasing springs 200 and 234. Since front indicating member 98 moves to different viewable positions relative to indicator housing 70, the rider can sense the currently selected speed stage without having to read numbers.

As shown in FIGS. 6(A–C), gearing member 154 is a generally rectangular shaped member with a generally flat top surface 260 and a generally flat bottom surface 264. A gearing wall 268 having a plurality of gearing teeth 270 disposed in a generally straight line extends from top surface 260 as an integral portion of top surface 260. As shown in FIGS. 3 and 8, the separate rear gear indicating member 104 has the form of a rear gear viewing needle 269 having a gear portion 271 that is rotatably mounted to indicator housing 70 through a pivot shaft 272. Gear portion 271 meshes with gearing teeth 270 so that rear gear indicating member 104 rotates around the axis defined by pivot shaft 272 in response to movement of gearing member 154. This, in turn, causes rear gear viewing needle 269 to move to different viewable positions along indicator housing 70.

Gearing member 154 includes a cable terminating projection 290 with a cable slot 291 extending from bottom surface 264 for retaining a cable end bead 292 formed on the end of inner wire 97 as shown in FIG. 4 by placing inner wire 97 in slot 291. Thus, cable terminating projection 290 functions as a coupling member for coupling inner wire 97 to gearing member 154. Cable terminating projection 290 slides within a straight recessed guide surface or track 293 formed in indicator housing 70 so that gearing member 154 moves in a straight line in response to movement of inner wire 97. Gearing member 154 also includes a spring retaining post 296 extending from bottom surface 264 for retaining one end of a coil spring 300. The other end of coil spring 300 is attached to a spring retaining post 304 extending from the surface of indicator housing 70. Thus, coil spring 300 functions as a biasing mechanism for biasing gearing member 154 to the left in FIGS. 3 and 4.

In operation, rotating rotatable member 50 of rear shift control device 22 causes the pulley inside housing 46 to pull inner wire 97. This causes gearing member 154 to move to the right as shown by arrow C in FIG. 8. As a result, rear gear viewing needle 269 moves from a lower speed position 310 toward a higher speed position 314 relative to indicator housing 70 as shown by arrow D. Rotating rotatable member 50 in the opposite direction causes gearing member 154 and rear gear indicating needle 269 to move in the opposite direction with the aid of biasing spring 300. The number of discrete positions assumed by rear gear viewing needle 269 depends on the number of speeds accommodated by rear shift control device 22. As with front gear indicating member 98, since rear gear indicating member 104 moves to different viewable positions relative to indicator housing 70, the rider can sense the currently selected speed stage without having to read numbers.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). For instance, the number of horizontal surfaces on camming member 150 may be varied as desired. Camming member 150 and gearing member 154 need not move in straight lines, and the orientation of gearing teeth 270 need not be in a straight line. Thus, the scope of the invention should not be limited by the specific structures disclosed or the apparent initial focus on a particular structure or feature.

What is claimed is:

1. An indicator unit for engaging a first control cable connected to a first bicycle shift control device and for engaging a second control cable connected to a second bicycle shift control device, wherein the indicator unit comprises:

a housing;

a first handlebar attachment member for attaching the housing to a handlebar;

a first intermediate member;

a first coupling member coupled to the first intermediate member for coupling the first intermediate member for movement with the first control cable;

a separate first indicating member viewable from outside the housing, wherein the first indicating member engages the first intermediate member so that movement of the first intermediate member causes movement of the first indicating member;

a second intermediate member;

a second coupling member coupled to the second intermediate member for coupling the second intermediate member for movement with the second control cable;

a separate second indicating member viewable from outside the housing, wherein the second indicating member engages the second intermediate member so that movement of the second intermediate member causes movement of the second indicating member;

a first biasing mechanism for biasing the first intermediate member in a first direction;

a second biasing mechanism for biasing the second intermediate member in a second direction;

wherein the first direction is different from the second direction;

a cam surface retained to one of the first intermediate member and the first indicating member;

a cam follower retained to the other one of the first intermediate member and the first indicating member; and wherein the cam follower slides along the cam surface for causing the first indicating member to move in response to movement of the first intermediate member.

2. The indicator unit according to claim 1 wherein the first direction is opposite the second direction.

3. The indicator unit according to claim 2 wherein the first biasing mechanism comprises a first spring coupled between the first intermediate member and the housing, and wherein the second biasing mechanism comprises a second spring coupled between the second intermediate member and the housing.

4. The indicator unit according to claim 1 wherein the first intermediate member moves along a first guide surface retained to the housing, and wherein the second intermediate member moves along a second guide surface retained to the housing.

5. The indicator unit according to claim 4 wherein the first intermediate member moves linearly along the first guide surface, and wherein the second intermediate member moves linearly along the second guide surface.

6. The indicator unit according to claim 5 wherein the first intermediate member moves in a straight line along the first guide surface, and wherein the second intermediate member moves in a straight line along the second guide surface.

7. The indicator unit according to claim 1 further comprising a third biasing mechanism for biasing the cam follower towards the cam surface.

8. The indicator unit according to claim 1 wherein the cam surface is formed on the first intermediate member.

9. The indicator unit according to claim 8 wherein a surface of the first indicating member forms the cam follower.

10. The indicator unit according to claim 1 wherein the first handlebar attachment member is movably coupled to the housing.

11. The indicator unit according to claim 1 further comprising a second handlebar attachment member for attaching the housing to a handlebar, wherein the second handlebar attachment member is spaced apart from the first handlebar attachment member.

12. The indicator unit according to claim 11 wherein the first handlebar attachment member is movably coupled to the housing, and wherein the second handlebar attachment member is movably coupled to the housing.

13. The indicator unit according to claim 11 wherein the first handlebar attachment member and the second handlebar attachment member both pivot around an axis substantially parallel to the direction of movement of the first intermediate member and the second intermediate member.

14. An indicator unit for engaging a first control cable connected to a first bicycle shift control device and for engaging a second control cable connected to a second bicycle shift control device, wherein the indicator unit comprises:

a housing:

a first handlebar attachment member for attaching the housing to a handlebar;

a first intermediate member;

a first coupling member coupled to the first intermediate member for coupling the first intermediate member for movement with the first control cable;

a separate first indicating member viewable from outside the housing, wherein the first indicating member engages the first intermediate member so that movement of the first intermediate member causes movement of the first indicating member;

a first gear that moves in response to movement of the first intermediate member;

a second gear coupled to the first indicating member;

wherein the first gear engages the second gear so that the first indicating member moves in response to movement of the first intermediate member;

a second intermediate member;

a second coupling member coupled to the second intermediate member for coupling the second intermediate member for movement with the second control cable;

a separate second indicating member viewable from outside the housing, wherein the second indicating member engages the second intermediate member so that movement of the second intermediate member causes movement of the second indicating member;

a first biasing mechanism for biasing the first intermediate member in a first direction;

a second biasing mechanism for biasing the second intermediate member in a second direction;

wherein the first direction is different from the second direction;

a cam surface retained to one of the second intermediate member and the second indicating member;

a cam follower retained to the other one of the second intermediate member and the second indicating member; and wherein the cam follower slides along the cam surface for causing the second indicating member to move in response to movement of the second intermediate member.

15. The indicator unit according to claim 14 wherein the first gear is integrally formed with the first intermediate member.

16. The indicator unit according to claim 15 wherein the first gear is formed by a surface of the first intermediate member.

17. The indicator unit according to claim 14 further comprising a third biasing mechanism for biasing the cam follower towards the cam surface.

18. The indicator unit according to claim 14 wherein the cam surface is formed on the second intermediate member.

19. The indicator unit according to claim 18 wherein a surface of the second indicating member forms the cam follower.

20. An indicator unit for engaging a control cable connected to a bicycle shift control device, wherein the indicator unit comprises:

a housing;

a handlebar attachment member for attaching the housing to a handlebar;

an intermediate member that is a separate member from the control cable and that moves along a guide surface retained to the housing;

a coupling member coupled to the intermediate member for coupling the intermediate member to the control cable at the housing so that the intermediate member moves linearly in a same direction as the control cable;

a separate indicating member engaging the intermediate member so that movement of the intermediate member along the guide surface causes the indicating member to rotate around a rotational axis; and wherein the indicating member is exposed for viewing when viewed in a direction along the rotational axis.

21. An indicator unit for engaging a first control cable connected to a first bicycle shift control device and for engaging a second control cable connected to a second bicycle shift control device, wherein the indicator unit comprises:

a housing;

a first handlebar attachment member for attaching the housing to a handlebar;

a first intermediate member;

a first coupling member coupled to the first intermediate member for coupling the first intermediate member for movement with the first control cable;

a separate first indicating member including an elongated lever-shaped first projection viewable from outside the housing, wherein the first indicating member engages the first intermediate member so that movement of the first intermediate member causes movement of the first projection to different viewable positions along the housing;

a second intermediate member;

a second coupling member coupled to the second intermediate member for coupling the second intermediate member for movement with the second control cable;

a separate second indicating member including an elongated lever-shaped second projection viewable from outside the housing, wherein the second indicating member engages the second intermediate member so that movement of the second intermediate member causes movement of the second projection to different viewable positions along the housing.

* * * * *